UNITED STATES PATENT OFFICE.

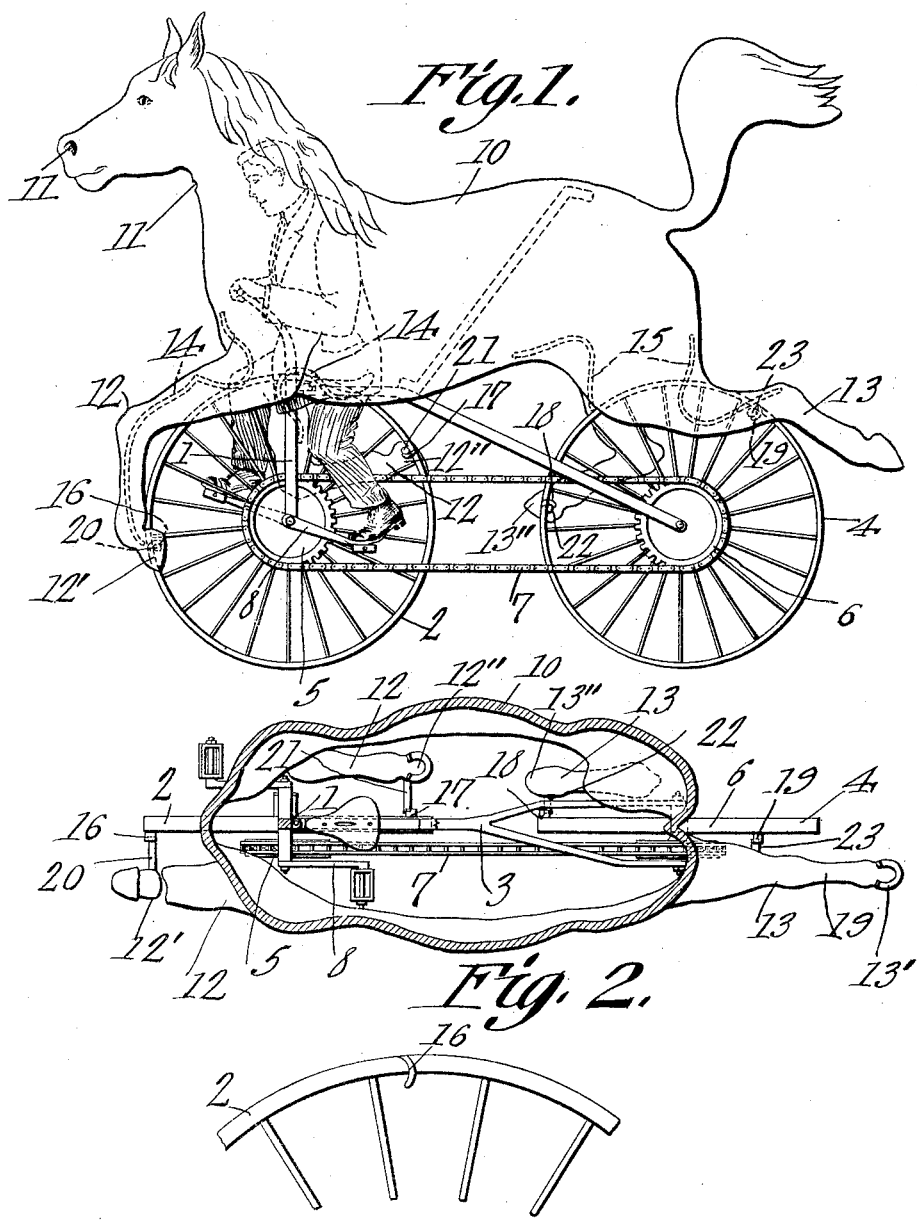

JAMES S. DEAN, OF TOLEDO, IOWA.

VELOCIPEDE.

1,111,825.  Specification of Letters Patent. Patented Sept. 29, 1914.

Application filed December 2, 1912. Serial No. 734,652.

*To all whom it may concern:*

Be it known that I, JAMES S. DEAN, a citizen of the United States, residing at Toledo, in the county of Tama and State of Iowa, have invented a new and useful Velocipede, of which the following is a specification.

This invention relates to velocipedes, one of its objects being to provide a structure of this character having a body portion in the form of an animal within which the person propelling the velocipede is adapted to be seated so that practically all portions of the body of the operator will be concealed.

Another object is to provide simple and efficient means whereby the front and rear wheels of the velocipede will receive power simultaneously from the operator, said wheels having means for actuating the legs of the animal so that, during the forward movement of the velocipede, the legs of the animal will move as when walking or running.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the velocipede. Fig. 2 is a horizontal section. Fig. 3 is an enlarged side elevation of a portion of one wheel.

Referring to the figures by characters of reference 1 designates a forked steering head in which is mounted the front supporting wheel of the velocipede, said wheel being indicated at 2. A frame 3 is pivotally connected to the steering fork and has a rear supporting wheel 4 journaled therein. A sprocket 5 rotates with wheel 2 and another sprocket 6 rotates with wheel 4 and these two sprockets are engaged by an endless chain 7 so that the two wheels 2 and 4 are positively rotated in unison. Crank hangers 8 are connected to the front wheel so that the occupant of a saddle 9 mounted on the frame 3 can thus rotate the wheel 2 and motion will be transmitted through chain 7 to the wheel 4.

Supported by the frame 3 is a housing 10 in the form of a horse or other animal there being sufficient room within the housing to receive the body of the operator.

Openings 11 can be provided wherever desired within the body 10 so that the operator can properly guide the velocipede. These openings 11 can be provided in the nostrils of the head or in the neck, as shown, or at any other desired points.

The front and rear legs 12 and 13 respectively extending from the body are of a flexible material, the front legs 12 housing spring strips 14. The spring 14 in one of the legs 12 is so shaped as to hold the hoof 12' normally elevated while the spring in the other front leg 12 is so shaped as to hold the hoof 12'' normally extended downwardly close to the ground. The rear legs 13 house springs 15 and the spring in one of these rear legs is so shaped as to hold the said leg with its hoof 13' normally close to the ground while the spring 15 in the other rear leg 13 serves to hold the hoof 13'' normally elevated.

Extending in opposite directions from the front wheel 2 are tripping yokes 16 and 17 so proportioned and located that, when the wheel 2 is rotated, yoke 16 will embrace and move downwardly against a finger 20 extending from the hoof 12' and lower and elongate the front leg 12 while the yoke 17 will push upwardly against and embrace a finger 21 extending from the hoof 12'' and raise the rear leg 12. This movement will be against the action of the springs 14 and, after the hoofs have reached the respective lower and upper limits of their movements, the yokes 16 and 17 will slip past them so that the springs 14 will immediately return the legs 12 to their normal positions, one leg 12 raised and the other leg 12 lowered. At the same time the rear wheel 3 operates upon the rear legs. For this purpose said wheel 4 has a laterally extending yoke 18 for engaging a finger 22 extending from the hoof 13'' and moving it downwardly against the action of its spring. Another yoke 19 extends laterally from the wheel and is adapted to engage a finger 23 on the rear leg 13 and swing it upwardly against the action of its spring 15 while the front leg 13 is moving downwardly. When the rear leg 13 has been raised to a predetermined height, yoke 19 will slip past the finger 23. Thus said rear leg will promptly swing downwardly to its normal position and, as soon as the front leg 13 is released from the yoke 18, it will spring upwardly to its normal position. Thus it will be seen that during the forward movement of the velocipede, the various legs depending from the body 10 will be given an up and down movement simulating that of the legs of a moving animal.

It is to be understood of course that means other than those described may be provided for actuating the legs of the body.

What is claimed is:

1. A machine of the class described, consisting of a wheel supported housing in the form of an animal, means within the housing for supporting an operator concealed in the housing, and means for actuation by the operator for rotating the wheels.

2. A machine of the class described, consisting of a wheel supported housing in the form of an animal, means within the housing for supporting an operator concealed in the housing, means for actuation by the operator for rotating the wheels, and means upon the wheels for actuating the legs of the housing.

3. A machine of the class described, consisting of a wheel supported housing in the form of an animal, means within the housing for supporting an operator concealed in the housing, and means for actuating by the operator for rotating the wheels, the legs of the housing being movably mounted, means for yieldingly holding the legs, and means upon the wheels for engaging, shifting and releasing the legs.

J. S. DEAN.

Witnesses:
WM. COLEMAN,
BEN T. DEAN.

Copies of this patent may be obtained for five cents each, by addressing the "Commissioner of Patents, Washington, D. C."